United States Patent [19]

Nakamura

[11] Patent Number: 5,841,436
[45] Date of Patent: Nov. 24, 1998

[54] APPARATUS AND METHOD FOR CONTROLLING DISPLAY OF WINDOW TITLES

[75] Inventor: Osamu Nakamura, Fukuoka, Japan

[73] Assignee: Matsushita Electric Industrial Co., Ltd., Osaka, Japan

[21] Appl. No.: 633,699

[22] Filed: Apr. 19, 1996

Related U.S. Application Data

[63] Continuation of Ser. No. 298,954, Sep. 1, 1994, abandoned.

[30] Foreign Application Priority Data

Sep. 6, 1993 [JP] Japan .................................. 5-221086

[51] Int. Cl.⁶ .................................................. G05B 13/00
[52] U.S. Cl. ........................... 345/342; 345/340; 345/344
[58] Field of Search ...................................... 395/157, 155, 395/158, 159, 160, 161, 342, 613, 332, 333, 343, 344, 345, 326, 339, 340, 346; 345/342, 340, 344, 341

[56] References Cited

U.S. PATENT DOCUMENTS

| | | | |
|---|---|---|---|
| 4,653,020 | 3/1987 | Cheselka et al. | 345/344 |
| 5,175,813 | 12/1992 | Golding et al. | 345/340 |
| 5,191,644 | 3/1993 | Takeda | 345/344 |
| 5,227,771 | 7/1993 | Ker et al. | 345/340 |
| 5,251,294 | 10/1993 | Abelow | 707/512 |
| 5,412,776 | 5/1995 | Bloomfield et al. | 345/346 |
| 5,428,735 | 6/1995 | Kahl et al. | 345/349 |
| 5,434,964 | 7/1995 | Moss et al. | 345/342 |
| 5,487,143 | 1/1996 | Southgate | 345/342 |
| 5,561,757 | 10/1996 | Southgate | 345/340 |

FOREIGN PATENT DOCUMENTS 3172891  7/1991  Japan .

Primary Examiner—Thomas G. Black
Assistant Examiner—Greth L. Robinson
Attorney, Agent, or Firm—Stevens, Davis, Miller & Mosher, L.L.P.

[57] ABSTRACT

This window title display control apparatus has a display control device for displaying data, a storing device for storing information regarding a plurality of windows to be displayed oil the display means, and a display control device for displaying a plurality of windows on the display means. The display control device includes a detecting device for detecting whether a first window and a predetermined area of a second window to be displayed on the display device overlap, and a device for moving the second window relative to the first window so that the first window and the predetermined area of the second window no longer overlap.

11 Claims, 12 Drawing Sheets

APPARATUS AND METHOD FOR CONTROLLING DISPLAY OF WINDOW TITLES

This application is a continuation of application Ser. No. 08/298,954, filed Sep. 1, 1994 (abandoned).

BACKGROUND OF THE INVENTION

1. Field of the Invention

The present invention relates to an apparatus and method for controlling display of window titles which controls a plurality of windows displayed on a screen of a personal computer, workstation, or the like, incorporating a window system.

2. Description of the Related Art

In recent years, personal computer, workstations, etc., have been provided with multi-window systems to enhance the capability of interfaces. In such a multi-window system, each of the windows is identified by displaying a title, called a window title, in a portion of each window in accordance with a program executed at the window or data displayed in the window.

In a conventional window title display control apparatus, as shown in FIG. 10, a window title is displayed in a title bar 71 which is set within a window 70.

In such a window title display method in the above-described conventional multi-window system, however, there is a problem that when a plurality of windows are displayed on the screen, a title bar displayed in a rear (lower side) window may be overlapped and hidden by another title bar displayed in a front (upper side) window, depending on how the windows overlap each another. Therefore, the user may forget the title within the overlapped window.

For example, as illustrated by window 92 and window 93 in FIG. 12, when title bar 92a or title bar 93a is overlapped by an upper side window 91, the window 92 or window 93 is identified by setting an input right (higher priority) to the window 92 or window 93. Then, 10 as shown in FIG. 11, the window(s) must be brought to the frontmost portion of the screen.

SUMMARY OF THE INVENTION

The object of the present invention is to provide a window title display control apparatus which allows the content of the information displayed in the rear of the window to be easily known even when it is overlapped by another window.

A window title display control apparatus according to the present invention has display means for displaying data; storing means for storing information regarding a plurality of windows to be displayed on the display means; and display control means for displaying a plurality of windows by overlapping them on said display means, with the plurality of windows each consisting of a plurality of areas, wherein the aforementioned display control means comprises detecting means for detecting how a plurality of areas in a first window and a second window to be displayed on the display means overlap; and changing means for displaying information displayed in a predetermined area of the second window in another area which is not overlapped by the first window, when it has been judged by the detecting means that a predetermined area among the plurality of areas of the second window is overlapped by the first window.

DETAILED DESCRIPTION OF THE PREFERRED EMBODIMENT

The first embodiment of the present invention will be described below with reference to the drawings.

Figure 1:
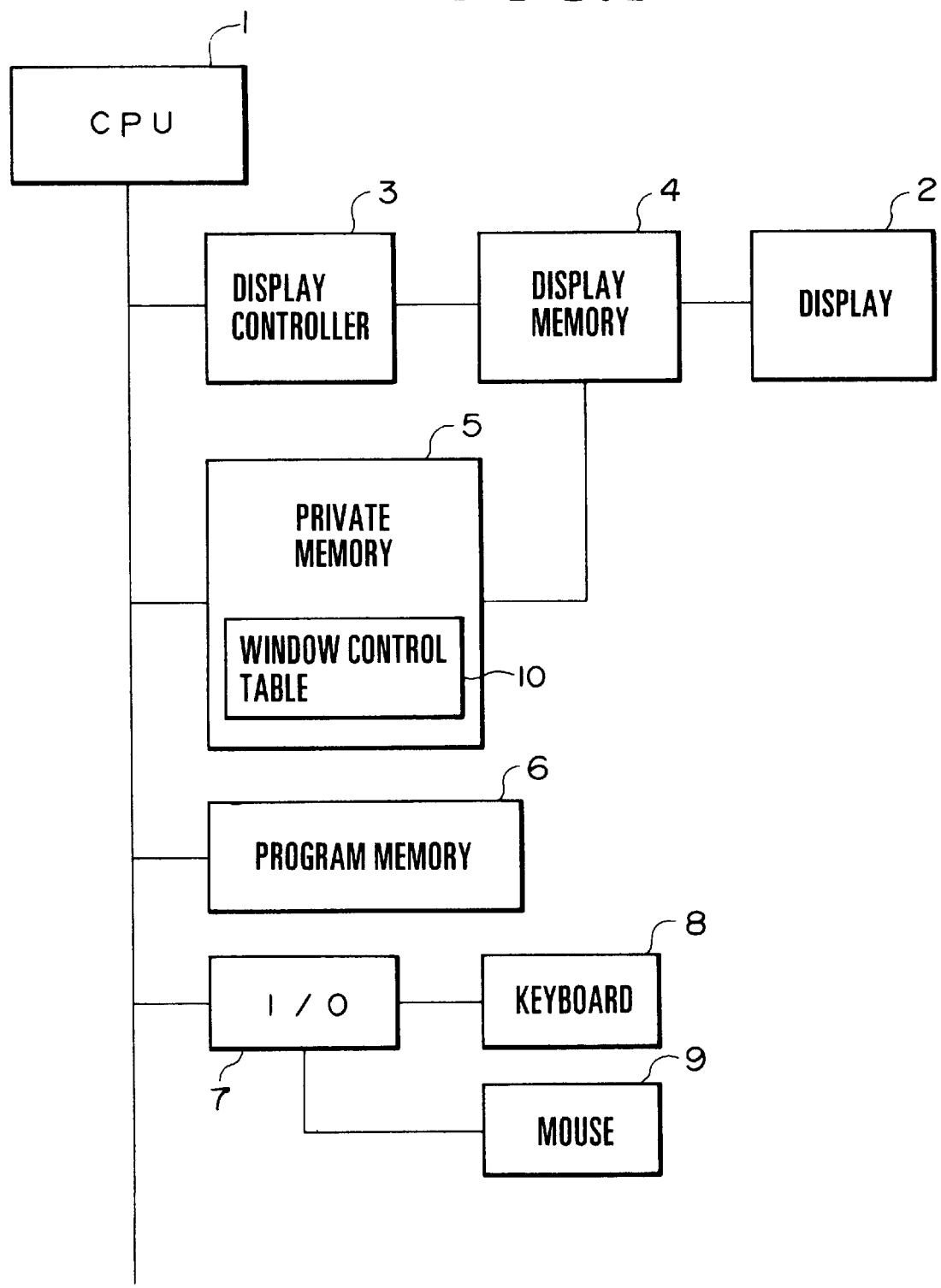
FIG. 1 is a block diagram of a window title display control apparatus in one embodiment of the present invention.

FIG. 1 is a block diagram of a window title display control apparatus utilizing a window title display control method in one embodiment of the present invention. In this figure, a keyboard 8 and a mouse 9, each of which serve as an input device, are connected to a central processing unit (hereinafter referred to as CPU) 1 through an input/output controller (hereinafter referred to as I/O). A private memory 5, which is connected to the CPU 1, contains a window control table 10 to control the window displayed on a display 2. In addition, for rapid performance of a series of display operations, the private memory 5 is connected to a display memory 4, which is directly connected to the display 2. In storing a window, the CPU 1 refers to the window control table 10 to transfer the necessary information to the display memory 4. In addition, a display controller 3, which controls the screen display 10 and is connected to the display memory 4, and a program memory 6, which stores a program for performing a series of operations, are connected to the CPU 1.

Figure 2:
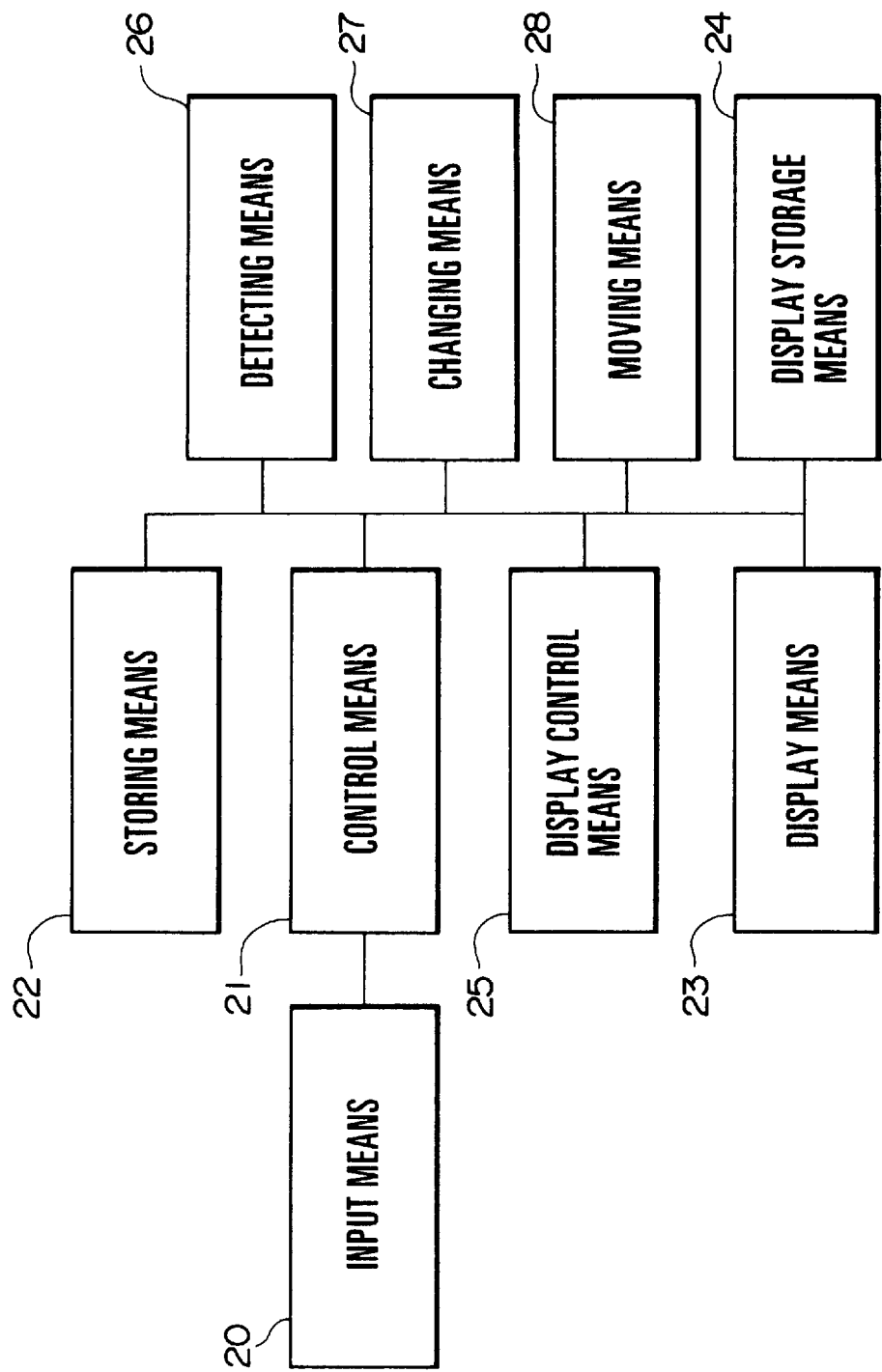
FIG. 2 is a block diagram illustrating an arrangement of the window title display control apparatus in one embodiment of the present invention.

FIG. 2 is a block diagram illustrating a construction of the present invention, in which the 15 reference numeral 20 denotes input means for inputting various types of information; the reference numeral 21 denotes control means for controlling each program to accomplish each of the operations of the present invention; the reference numeral 22 denotes storing means for storing each of the aforementioned programs; the reference numeral 23 denotes display means for displaying data; the reference numeral 24 denotes display storage means for storing information regarding a plurality of windows to be displayed on the display 25 means 23; and the reference numeral 25 denotes display control means for displaying a plurality of windows by overlapping them on the display means 23, in accordance with the information stored in the display storage means 24.

In addition, the display control means 25 comprises detecting means 26, changing means 27, and moving means 28.

The detecting means 26 detects how a plurality of areas of a first window and a second window to be displayed on the display means 23 overlap.

When the detecting means 27 has judged that the first window overlaps predetermined areas among the aforementioned plurality of areas of the second window, the changing means causes the information displayed in the predetermined areas of the second window to be displayed in another area which is not overlapped by the first window.

When the detecting means 22 has detected that the first window 1 overlaps all of the plurality of areas of the second window, the moving means moves the second window such that there is an increase in the percentage of display of area with the highest display percentage among the plurality of areas.

Figure 10:
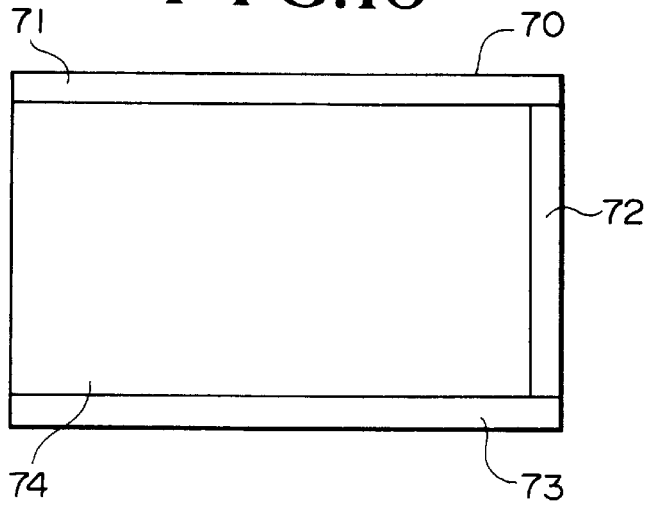
FIG. 10 shows an example of a displayed window in the same embodiment.

FIG. 10 illustrates an example of a window which is displayed on the display 2 in the embodiment. In the figure, a window 70 is provided with a title bar 71 for displaying the window title, a vertical scroll bar 72, which is used for vertically scrolling displayed information in the window 70, a horizontal scroll bar 73, which is used for horizontally scrolling the same displayed information in the window 70, and a panel body 74 for displaying characters, graphics, or the like.

Figure 3:
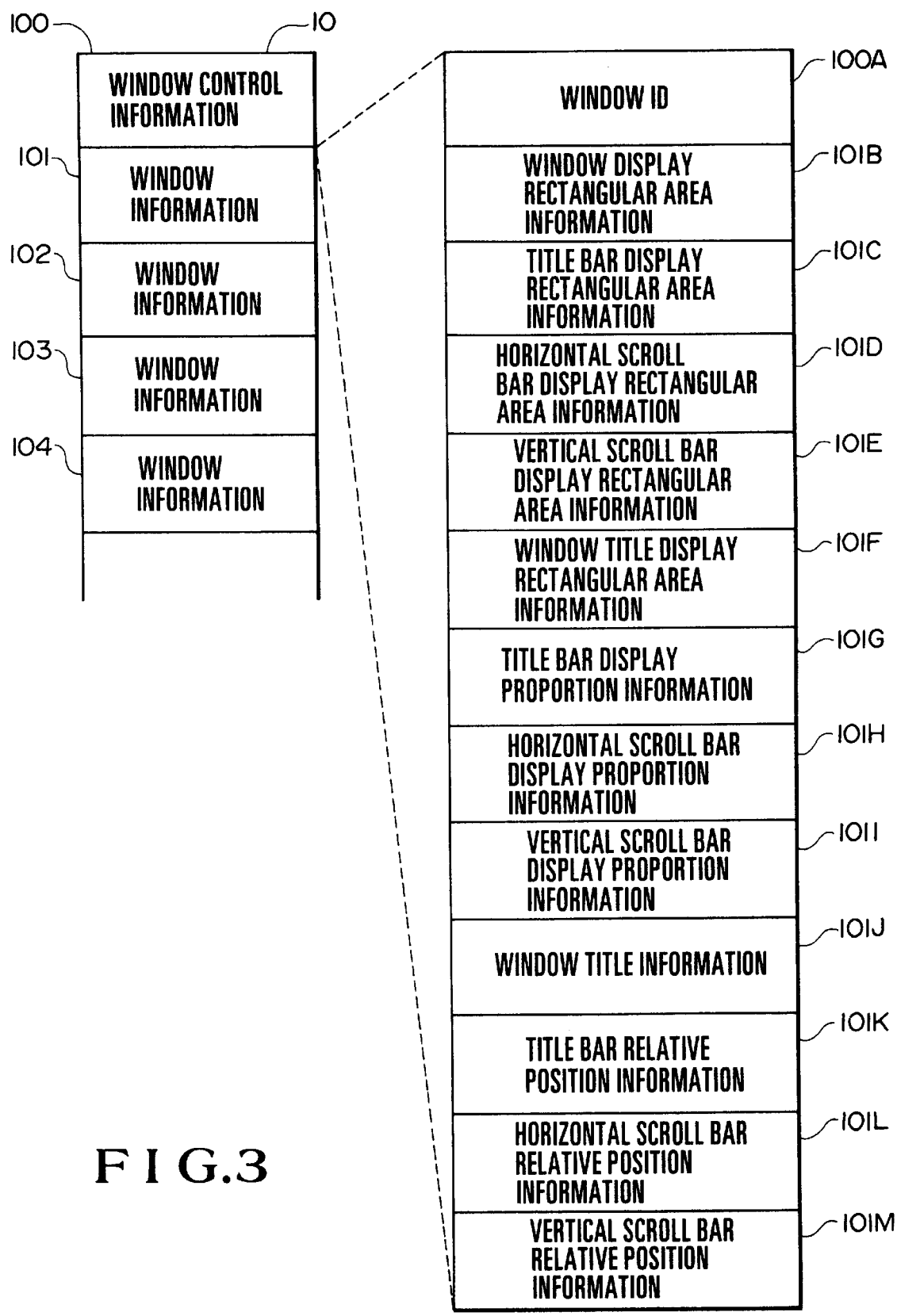
FIG. 3 is a structural view of a window control table in the same embodiment.

FIG. 3 illustrates a structure of data of the window control table 10 stored in the private memory 5. As shown in the figure, the window control table 10 contains information regarding a plurality of windows which correspond to the windows displayed on the display 2, and window control information 100 for controlling how the windows overlap with one another. In FIG. 3, window information 101 through 104 are illustrated, but the number of windows can be increased or decreased, depending on how many windows are to be displayed on the display 2. Each of the window information has a similar structure.

The window control information 100 is used for controlling how the windows overlap on the display 2. The ID of each of the windows is stored starting from that of the window on the frontmost part of the screen to that at the rearmost part of the screen. Accordingly, when the windows are displayed, the CPU 1 refers to the window control information 100 to display the windows starting from those at the rear of the screen.

In the window control information 100, the window which corresponds to the window ID at the frontmost part of the screen is called the current window. Commands are input using the keyboard 8 with respect to the current window. The current window is not overlapped by any other window, so that there are no portions thereof hidden from the user.

Figure 9:
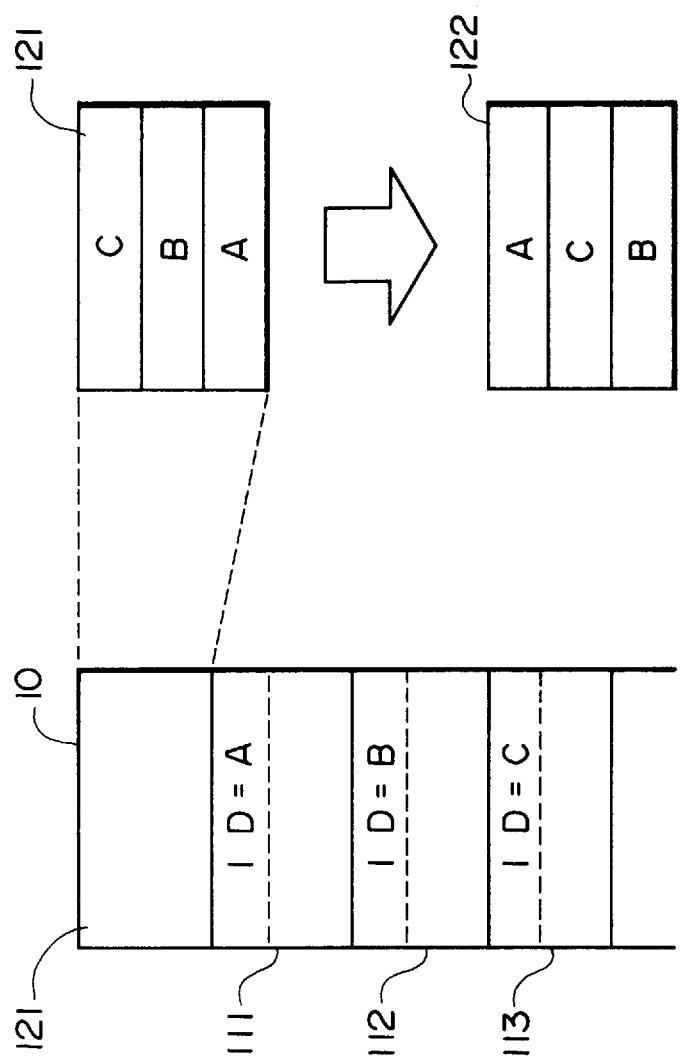
FIG. 9 is an explanatory view of window control information in the same embodiment.
Figure 11:
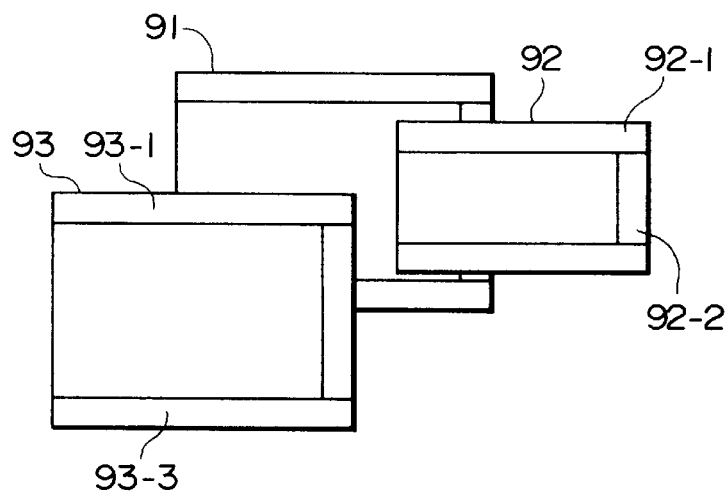
FIG. 11 shows an example of a plurality of displayed windows in the same embodiment.
Figure 12:
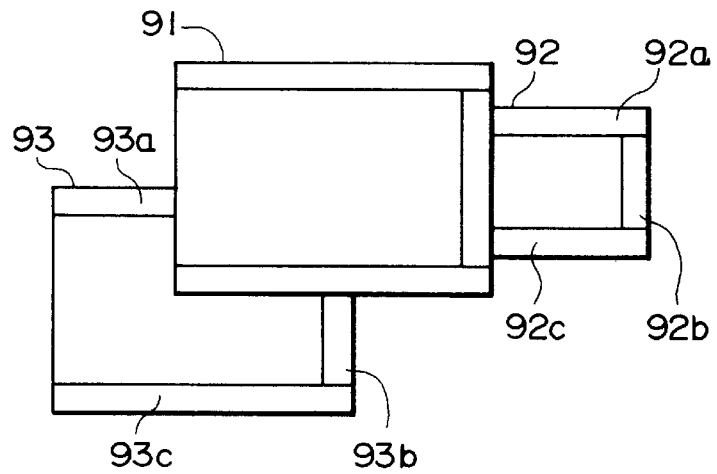
FIG. 12 shows an example of a plurality of displayed windows in the same embodiment.

In the example illustrated in FIG. 11, window 93 is the current window, and window 91 is the rearmost window. The information of window 91, window 92, and window 93 correspond to window information 111 (window ID is A), window information 112 (window ID is B), and window information 113 (window ID is C), respectively, which are illustrated in FIG. 9. Window control information 121 is as shown in the same figure. Here, when the mouse 9 is used to give a command to change the current window from window 93 to window 91, as shown in FIG. 12, the window control information 121 is also changed to window control information 122.

The window information 101 includes window ID 100A, or ID codes corresponding to each of the windows to be displayed on the display 2; window display rectangular area information 101B for storage of the left upper point and the right lower point of the window of the display 2; title bar display rectangular area information 101C for storage of the left upper point and the right lower point of the title bar within the window; horizontal scroll bar display rectangular area information 101D for storage of the left upper point and the right lower point of the horizontal scroll bar within the window; vertical scroll bar display rectangular area information 101E for storage of the left upper point and the right lower point of the vertical scroll bar within the window; window title display rectangular area information 101F for storage of the left upper point and the right lower point of the rectangular area where the window title is actually displayed; title bar display proportion information 101G, horizontal scroll bar display proportion information 101H, and vertical scroll bar display proportion information 101I, which are, respectively, information regarding how much of the entire title bar, horizontal scroll bar, and vertical scroll bar, are actually displayed on the display 2 (value becomes less than "1", when a part of the title bar, horizontal scroll bar, or vertical bar, is hidden by another window); and window title information 101J for storage of window title as character data.

Figure 4:
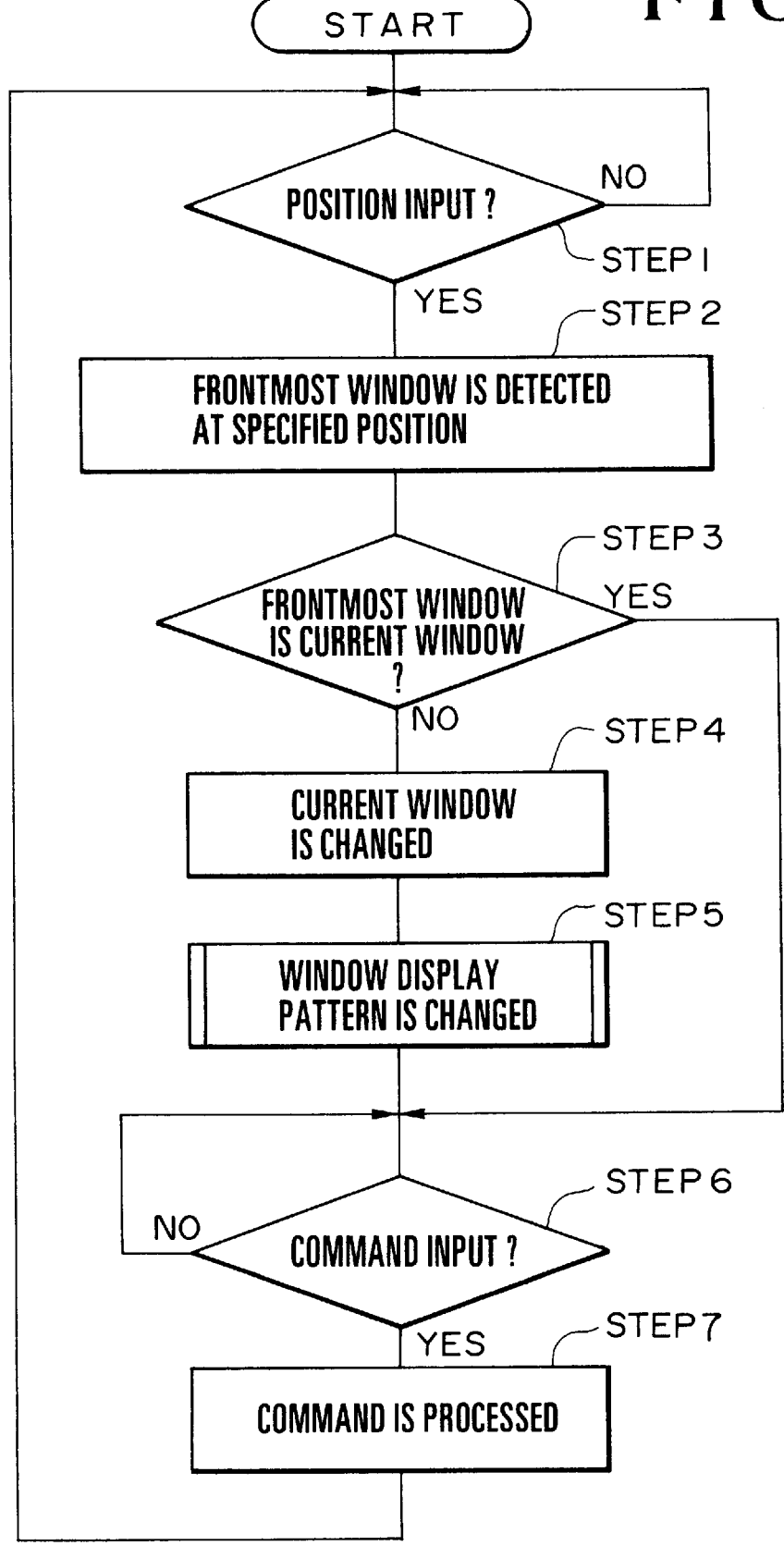
FIG. 4 is a flow chart illustrating an operation in the same embodiment.
Figure 5:
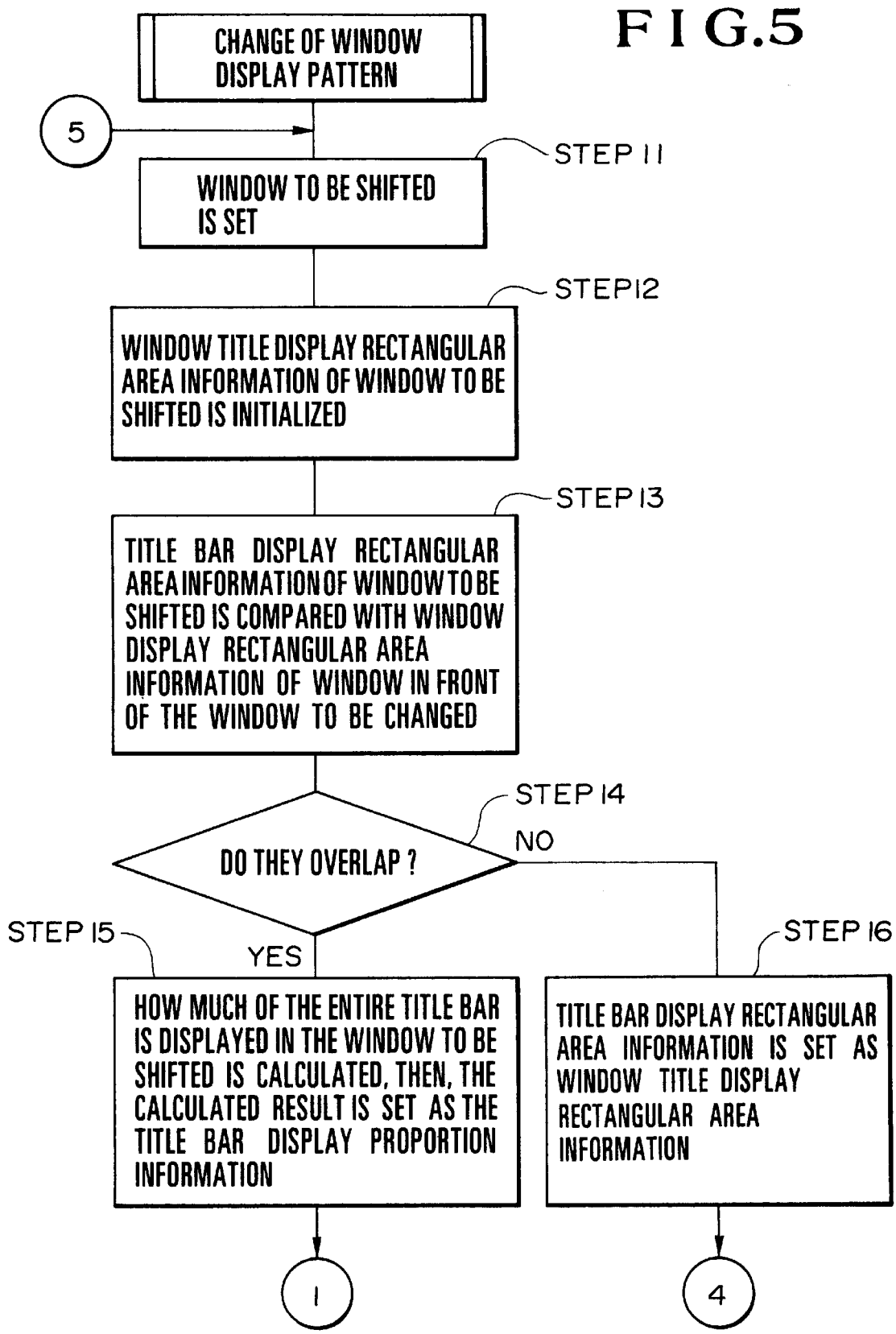
FIG. 5 is a flow chart illustrating an operation in the same embodiment.
Figure 6:
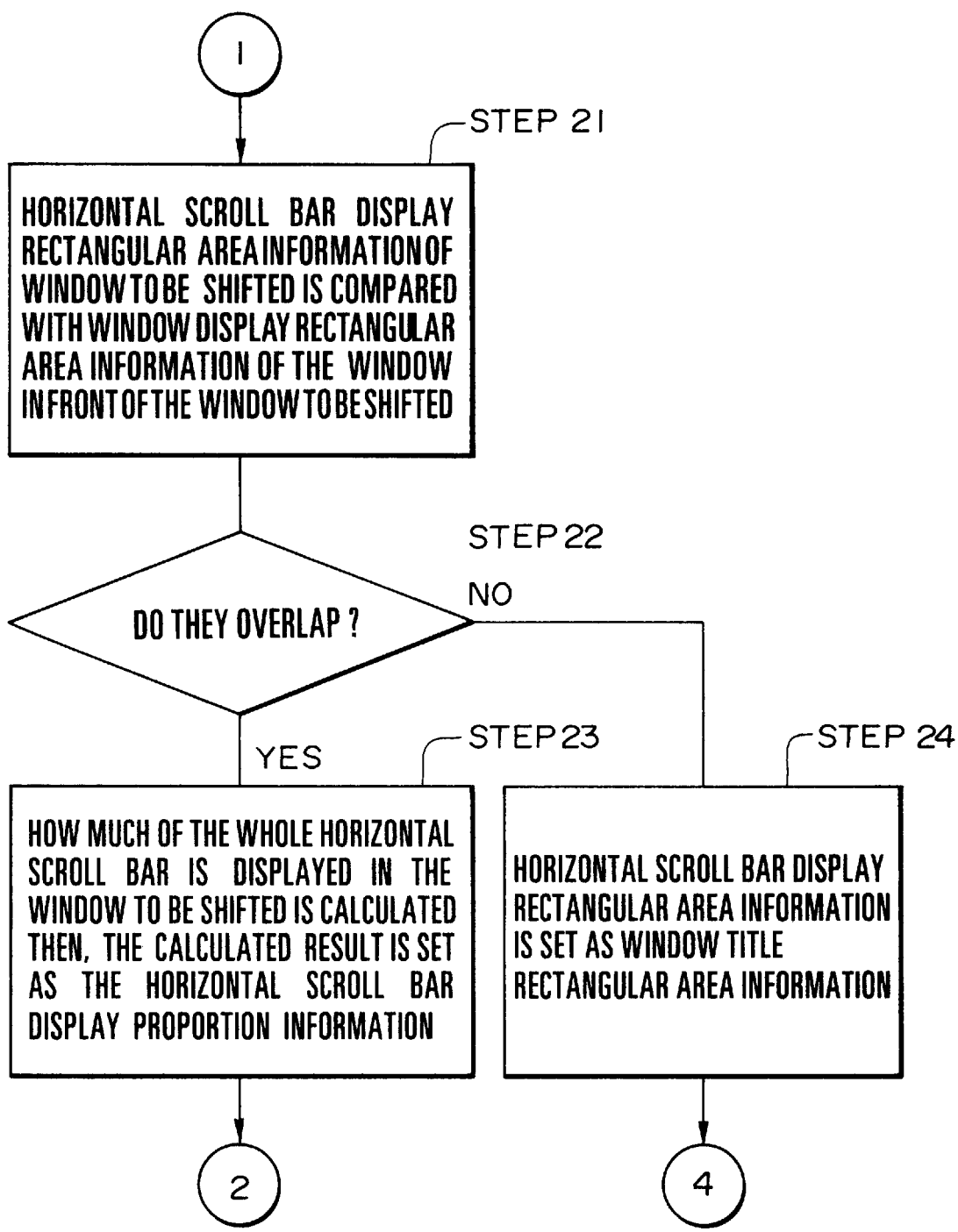
FIG. 6 is a flow chart illustrating an operation in the same embodiment.
Figure 7:
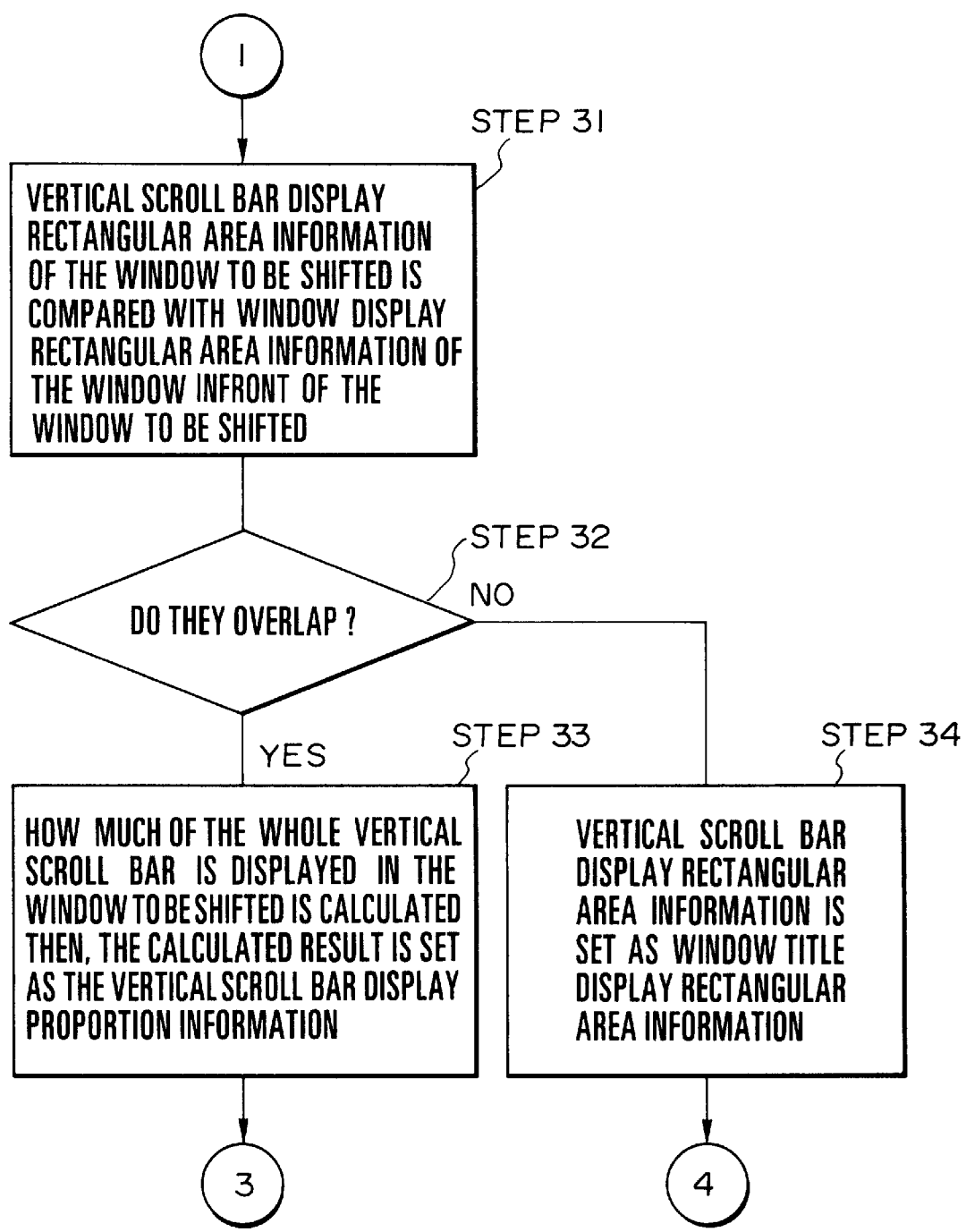
FIG. 7 is a flow chart illustrating an operation in the same embodiment.
Figure 8:
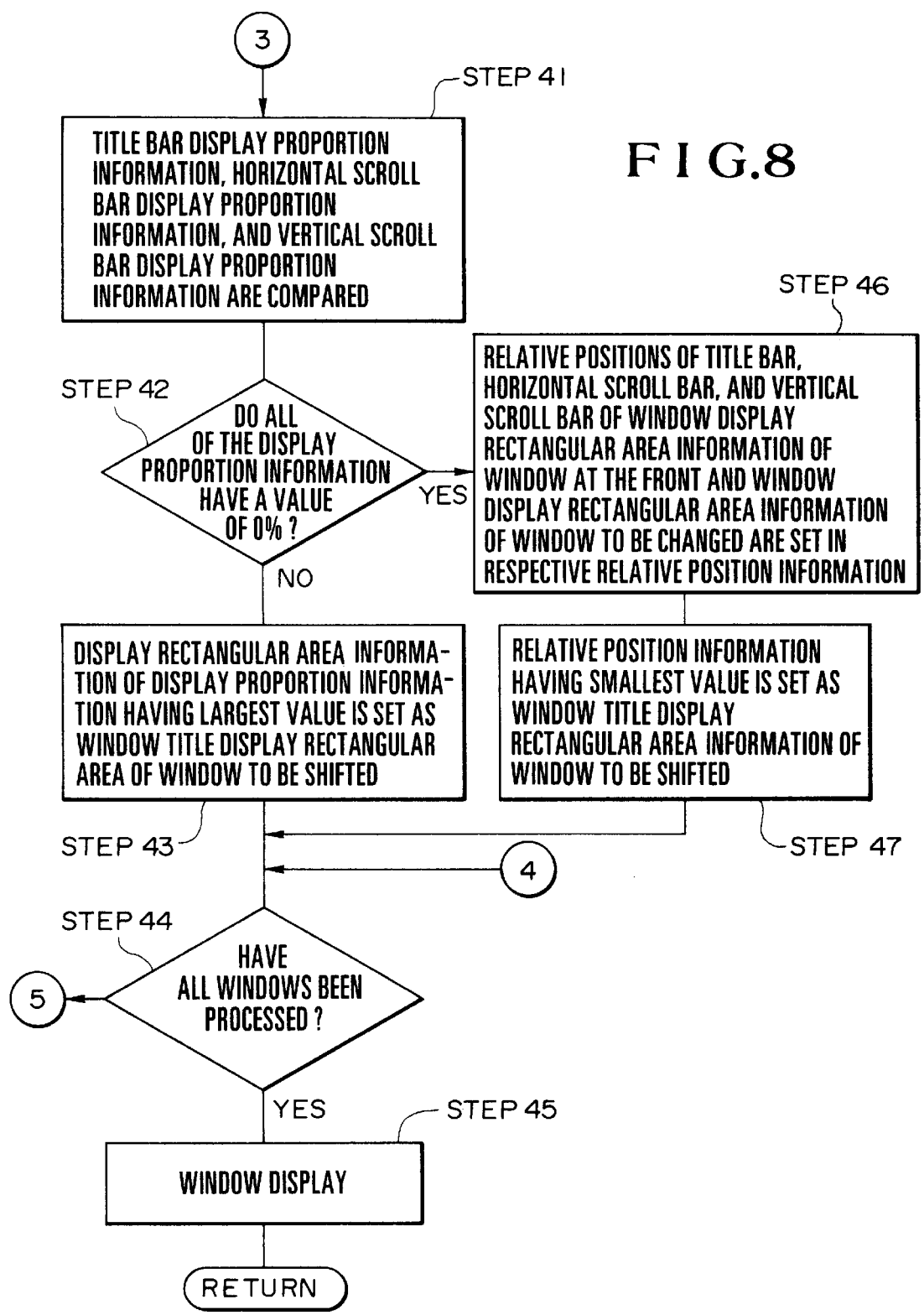
FIG. 8 is a flow chart illustrating an operation in the same embodiment.

The operation of the window display control apparatus of the embodiment having the above-described construction will be explained with reference to the flow chart of FIG. 4.

First, specifying a position on the display 2 by the mouse 9 causes the CPU 1 to examine whether or not the specified position in Step 1 is included in each of the windows, based on the window display rectangular 25 area information in each of the window information contained in the window control table 10. An examination of the window control information 100 for each of the windows including the specified position allows the window at the frontmost part to be detected at the specified position (Step 2).

Here, when the frontmost window detected in Step 2 is the current window, the process proceeds to Step 4 and Step 5.

In Step 4, when the window ID corresponding to the window, detected in Step 2, in the window control information 100 is changed to the frontmost window, the current window is changed. Therefore, in Step 5, the window display pattern is changed because there is a change in the relationship of overlap between each of the windows to be displayed.

After the window display pattern has been changed, a command is input with a keyboard with respect to the detected window in Step 2 (Step 6). This allows the CPU 1 to process the command (Step 7). The process returns back to Step 1.

That is, in the embodiment, for example, as shown in FIG. 11, when the window 91, the window 92, and the window 93 are displayed on the display 2, with the window 93 being the current window, inputting the position on the display portion of the window 91 causes the window 91, shown in FIG. 12, to become the current window, so that it is displayed at the frontmost portion of the screen. Here, the window title, which is displayed at a title bar 92a of the window 92, is displayed on the vertical scroll bar 92b, or the window title, which is displayed at a title bar 93a of the window 93, is displayed at a horizontal scroll bar 93c.

Next, the processes carried out in Step 5 for hanging the window display pattern will be described with reference to the flow charts of FIGS. 5 through 8.

First, based on the window ID, which is set in the window control information 100, the CPU 1 sets the window to be shifted, which gives rise to a change in the window display pattern (Step 11). The window to be shifted is set from the windows of the rear portions contained in the window control information 100. (Here, the window information 101 of FIG. 2 will be used for the description).

Next, initialization is carried out for the window title display rectangular area information 101H of the window to be shifted (Step 12). After initialization, first, the title bar display rectangular area information 101C of the window to be shifted is compared with the window display rectangular area information of the window located in front of the window to be shifted. Then, the CPU 1 examines whether or not the title bar of the window to be shifted and the window displayed in front of the window to be shifted overlap (Step 13). If they do, the CPU 1 carries out Step 15, and if they do not, it carries out Step 16 (Step 14).

In Step 15, how much of the entire title bar is displayed in the window to be shifted (the portion of the title bar which does not overlap with the windows located in front of the window to be shifted) is calculated. After the calculated result has been set as the title bar display proportion information 101G, the process proceeds to Step 21.

In Step 16, the title bar display rectangular area information 101C is set as the window title display rectangular area information 101F. Then, the process proceeds to Step 44.

In Step 21, the horizontal scroll bar display rectangular area information 101D of the window to be shifted is compared with the window display rectangular area information of the window displayed in front of the window to be shifted. Then, the CPU 1 examines whether or not the horizontal scroll bar of the window to be shifted and the window displayed in front of the window to be shifted overlap. If they do, the process proceeds to Step 23, and if they do not, the process proceeds to Step 24 (Step 22).

In Step 23, how much of the whole horizontal scroll bar is displayed in the window to be shifted (the portion where the horizontal scroll bar and the window displayed in front of the window to be shifted do not overlap) is calculated. The calculated result is set as the horizontal scroll bar display proportion information 101H. Then, the process proceeds to Step 31.

In Step 24, the horizontal scroll bar display rectangular area information 101D is set as the window title display rectangular area information 101F. Then, the process proceeds to Step 44.

In Step 31, the vertical scroll bar display rectangular area information 101 of the window to be shifted is compared with the window display rectangular area information of the window displayed in front of the window to be shifted. Then, the CPU 1 examines whether or not the vertical scroll bar of the window to be shifted and the window displayed in front of the window to be shifted overlap. If they do, the process proceeds to Step 33, and if they do not, the process proceeds to Step 34 (Step 32).

In Step 33, how much of the whole vertical scroll bar is displayed in the window to be shifted (the portion where the vertical scroll bar and the window displayed in front of the window to be shifted do not overlap) is calculated. The calculated result is set as the vertical scroll bar display proportion information 101I. Then, the process proceeds to Step 41.

In Step 34, the vertical scroll bar display rectangular area information 101E is set as the window title display rectangular area information 101F. Then, the process proceeds to Step 44.

Figure 13:
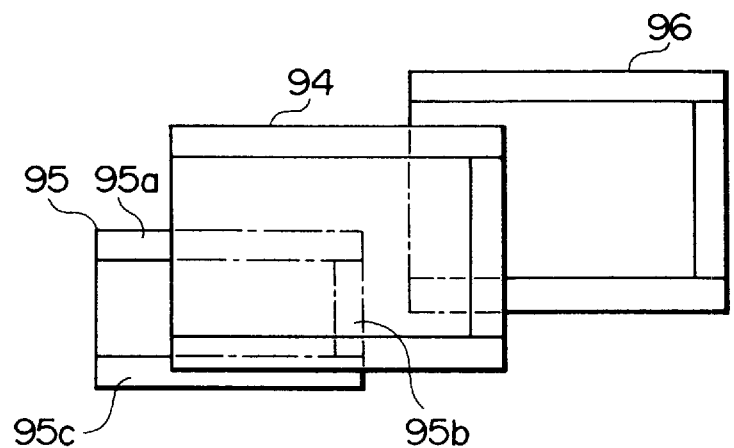
FIG. 13 shows an example of a plurality of displayed windows in the same embodiment.
Figure 14:
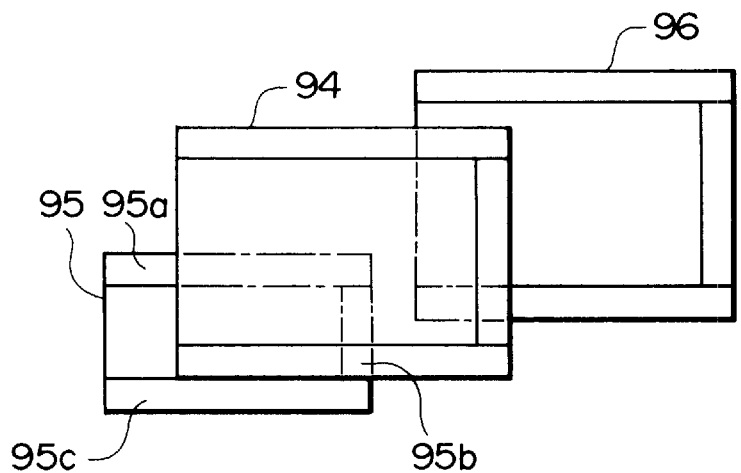
FIG. 14 shows an example of a plurality of displayed windows in the same embodiment.

After the aforementioned processes have been carried out, if any one of the bars, the title bar, horizontal scroll bar, or vertical scroll bar is found to be overlapped by the aforementioned window, Step 41 is carried out to compare the percentage values of the title bar display proportion information 101G, the horizontal scroll bar 101H, and the vertical scroll bar display proportion information 101I. In Step 43, the display proportion information, having the highest percentage value (bar having the largest proportion displayed), is selected. As shown in FIG. 13, title bar 95*a*, horizontal scroll bar 95*c*, and vertical scroll bar 95*b*, are all overlapped by the current window 94. If the horizontal scroll bar proportion information has the highest percentage value, the horizontal scroll bar 95*c* is selected.

Figure 15:
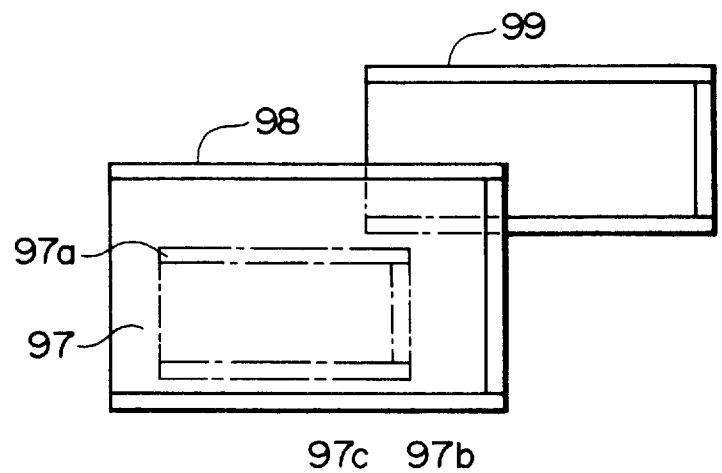
FIG. 15 shows an example of a plurality of displayed windows in the same embodiment.

In Step 42, during selection, when all of the display proportion information has a value of 0% (that is, when the title bar, the horizontal scroll bar, and the vertical scroll bar are not visibly displayed), the process proceeds to Step 46. After the process has been carried out, the CPU 1 selects either one of title bar, horizontal scroll bar, or vertical scroll bar. (In Step 46, calculation is carried out to find out the relative positions of the title bar, the horizontal scroll bar, and the vertical scroll bar of the window display rectangular area information 101B of the window displayed in the front and those for the window display rectangular area information 101B of the window to be shifted. Then, the calculated results are set, respectively, as title bar relative position information 101K, the horizontal scroll bar relative position information 101L, and the vertical scroll bar relative position information 101M.) Hereafter, in Step 47, the relative positions are compared, after which the relative position information with the smallest value is selected. As shown in FIG. 15, title bar 97*a*, horizontal scroll bar 97*c*, and vertical scroll bar 97*b* are all completely overlapped by current window 98. Further, if the horizontal scroll bar has the lowest value of relative position information, the horizontal scroll bar is selected.

Any one of the bar selected out of the three bars: title bar, horizontal scroll bar, or vertical scroll bar is shifted within the display screen in accordance with a predetermined rule by moving the window, itself, to further increase the proportion of it displayed (or, the percentage value of the display proportion information). More specifically, the window to be shifted is moved within the display screen in the direction of its diagonal, or the vertical direction, in accordance with an appropriate algorithm.

Figure 16:
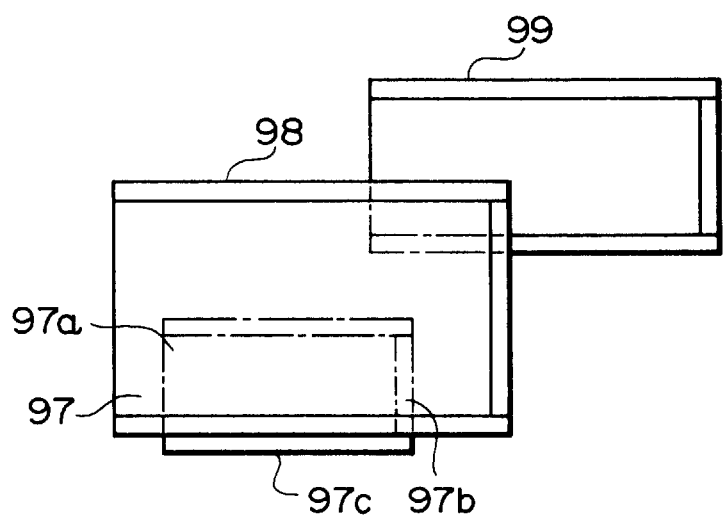
FIG. 16 shows an example of a plurality of displayed windows in the same embodiment.

In other words, when none of the display proportion information has a value of 0%, and the horizontal scroll bar has been selected, as shown in FIG. 13, the proportion of display of horizontal scroll bar 95*c* is increased, and window 95 is moved such that it does not disappear from the display screen. In addition, when all of the display proportion information has a value of 0%, and the horizontal scroll bar has been selected, as shown in FIG. 16, the proportion of display of horizontal scroll bar 97*c* is increased, and window 97 is moved such that it does not disappear from the display screen.

Then, when it has been moved, each of the rectangular area information and the display proportion information of the above-described window information regarding the window 95 are rewritten.

After the processes in Steps 16, 24, 34, or 43 have been carried out, in Step 44, the CPU 1 checks whether or not the processes have been performed for all of the other windows among the windows controlled by the window control information 100, excluding the current window. If there are processes which have not been performed for any of the windows, the process returns back to Step 11 and the processes are repeated. After the processes for all of the windows have been carried out, the process proceeds to Step 45 to re-display the window, based on the window control table 10.

What is claimed is:

1. A window display control apparatus comprising:

display means for displaying data in a plurality of windows including a first window and a second window;

storing means for storing information regarding positional relationships among said plurality of windows; and display control means for controlling said display means to display said plurality of windows by overlapping said plurality of windows on said display means, in accordance with said information stored in said storing means;

wherein said display control means comprises:

detecting means for detecting, in accordance with portions of said information associated with said first window and said second window, whether said first window overlays a predetermined area of said second window; and changing means for moving, when said detecting means has detected that said first window overlays said predetermined area of said second window, said second window as a whole relative to said first window so that said first window no longer overlays said predetermined area of said second window and so that said predetermined area of said second window is displayed.

2. A window display control apparatus comprising:

display means for displaying data in a plurality of windows including a first window and a second window, said second window having a plurality of predetermined areas, on one of which a predetermined portion of said data is displayed;

storing means for storing information regarding positional relationships among said plurality of windows; and display control means for controlling said display means to display said plurality of windows in accordance with said information stored in said storing means with said windows overlapping one another on said display means, said display control means comprising:

detecting means for detecting, in accordance with portions of said information associated with said first window and said second window, whether said first window overlays each of said plurality of predetermined areas of said second window; and changing means, responsive to said detecting means detecting that said first window overlays each of said plurality of predetermined areas of said second window, for moving said second window as a whole relative to said first window so that said first window no longer overlays at least one of said predetermined areas of said second window and displaying said predetermined portion of said data in said at least one of said plurality of predetermined areas of said second window which is not overlaid by said first window, so that said predetermined portion of said data is displayed.

3. A window display control apparatus comprising:

display means for displaying data in a plurality of windows including a first window and a second window, said second window having a plurality of predetermined areas;

storing means for storing information regarding positional relationships among said plurality of windows; and display control means for controlling said display means to display said plurality of windows by overlapping said plurality of windows on said display means, in accordance with said information stored in said storing means;

wherein said display control means comprises:

detecting means for detecting whether said first window at least partially overlays one of said plurality of predetermined areas of said second window which contains a predetermined portion of said data and for detecting another one of said plurality of predetermined areas of said second window which is in a non-overlaid relationship with said first window; and changing means for moving, when said detecting means detects that said first window at least partially overlays said one of said plurality of predetermined areas of said second window which contains said predetermined portion of said data, said predetermined portion of data to said another one of said plurality of predetermined areas which is in said non-overlaid relationship with said first window so that said predetermined portion of data is displayed.

4. A window display control method in which a plurality of windows including a first window and a second window are displayed on a display, said method comprising:

(a) detecting whether said first window overlays a predetermined area of said second window; and (b) when it has been detected in step (a) that said first window overlays said predetermined area of said second window, automatically moving said second window as a whole relative to said first window so that said predetermined area of said second window is no longer overlaid by said first window and so that said predetermined area of said second window is displayed.

5. A window display control apparatus according to claim 1, wherein said predetermined area of said second window comprises a title bar.

6. A window display control apparatus according to claim 1, wherein said predetermined area of said second window comprises a scroll bar.

7. A window display control apparatus according to claim 2, wherein said predetermined portion of said data comprises a title of said second window.

8. A window display control apparatus according to claim 3, wherein said predetermined portion of said data comprises a title of said second window.

9. A window display control method according to claim 4, wherein said predetermined area of said second window comprises a title bar.

10. A window display control method according to claim 4, wherein said predetermined area of said second window comprises a scroll bar.

11. A window display control apparatus according to claim 2, wherein:

said detecting means comprises means for detecting a proportion of each of said plurality of predetermined areas of said second window which is not overlaid by said first window; and said changing means comprises means for moving said second window as a whole relative to said first window so that one of said plurality of predetermined areas for which said proportion is greatest is not overlaid by said first window.

\* \* \* \* \*